(12) United States Patent
Meng et al.

(10) Patent No.: US 6,919,029 B2
(45) Date of Patent: Jul. 19, 2005

(54) METHODS OF PREPARING A SURFACE-ACTIVATED TITANIUM OXIDE PRODUCT AND OF USING SAME IN WATER TREATMENT PROCESSES

(75) Inventors: Xiaoguang Meng, Highland Park, NJ (US); Mazakhir Dadachov, Mahopac, NY (US); George P. Korfiatis, Basking Ridge, NJ (US); Christos Christodoulatos, Basking Ridge, NJ (US)

(73) Assignee: Trustees of Stevens Institute of Technology, Hoboken, NJ (US)

( * ) Notice: Subject to any disclaimer, the term of this patent is extended or adjusted under 35 U.S.C. 154(b) by 53 days.

(21) Appl. No.: 10/304,550

(22) Filed: Nov. 26, 2002

(65) Prior Publication Data

US 2003/0155302 A1 Aug. 21, 2003

Related U.S. Application Data

(60) Provisional application No. 60/357,051, filed on Feb. 14, 2002.

(51) Int. Cl.⁷ .......................... C02F 1/28; C01G 23/047
(52) U.S. Cl. ...................... 210/665; 210/681; 423/610
(58) Field of Search ................................. 210/665, 681; 423/610, 611, 612

(56) References Cited

U.S. PATENT DOCUMENTS

| | | | |
|---|---|---|---|
| 3,332,737 A | | 7/1967 | Kraus |
| 4,264,421 A | * | 4/1981 | Bard et al. ............. 204/157.51 |
| 4,313,844 A | | 2/1982 | Sato et al. |
| 4,474,853 A | | 10/1984 | Watanabe |
| 4,661,282 A | | 4/1987 | Clark |
| 4,665,050 A | | 5/1987 | Degen et al. |
| 4,692,431 A | | 9/1987 | Weller |
| 4,803,064 A | | 2/1989 | Montino et al. ............ 423/612 |
| 4,954,476 A | | 9/1990 | Hums |
| 5,053,139 A | | 10/1991 | Dodwell et al. |
| 5,227,053 A | | 7/1993 | Brym |
| 5,277,931 A | | 1/1994 | Maglio et al. |
| 5,294,315 A | | 3/1994 | Cooper et al. |
| 5,468,463 A | | 11/1995 | Butje et al. ............. 423/612 |
| 5,618,437 A | | 4/1997 | Ulan et al. |
| 5,630,995 A | | 5/1997 | Foulger et al. |
| 5,639,550 A | | 6/1997 | Lisenko |
| 5,766,784 A | | 6/1998 | Baskaran et al. |
| 5,840,111 A | | 11/1998 | Wiederhoft et al. |
| 5,948,726 A | | 9/1999 | Moskovitz et al. |
| 5,973,175 A | | 10/1999 | Bruno |
| 6,001,326 A | * | 12/1999 | Kim et al. ............... 423/598 |
| 6,086,844 A | | 7/2000 | Koike et al. |
| 6,162,759 A | | 12/2000 | Oki et al. |
| 6,191,067 B1 | | 2/2001 | Koike et al. |
| 6,248,217 B1 | | 6/2001 | Biswas et al. |
| 6,251,823 B1 | | 6/2001 | Yamaguchi et al. |
| 6,268,307 B1 | | 7/2001 | DeFilippi et al. |
| 6,306,361 B1 | | 10/2001 | Shin et al. |
| 6,331,351 B1 | | 12/2001 | Waters et al. |
| 6,338,830 B1 | | 1/2002 | Moskovitz et al. |
| 6,340,433 B1 | | 1/2002 | Kuznicki et al. |
| 6,342,191 B1 | | 1/2002 | Kepner et al. |
| 6,375,923 B1 | | 4/2002 | Duyvesteyn et al. |
| 6,383,273 B1 | | 5/2002 | Kepner et al. |
| 6,383,395 B1 | | 5/2002 | Clarke et al. |
| 6,399,540 B1 | | 6/2002 | Oki et al. |
| 6,409,961 B1 | | 6/2002 | Koike et al. |
| 6,444,608 B1 | | 9/2002 | Oki et al. |
| 6,517,804 B1 | * | 2/2003 | Kim et al. ............... 423/610 |
| 6,653,356 B2 | | 11/2003 | Sherman |
| 2001/0016264 A1 | | 8/2001 | Ohmori et al. ............. 428/472 |
| 2002/0045545 A1 | | 4/2002 | Oki et al. |
| 2002/0077249 A1 | | 6/2002 | Schlegel et al. |

FOREIGN PATENT DOCUMENTS

| | | |
|---|---|---|
| CA | 1122876 | 5/1982 |
| DE | 4216122 | 11/1993 |
| DE | 101 16 953 A1 | 10/2002 |
| EP | 1182169 | 2/1999 |
| EP | 1 167 296 A1 | 1/2002 |
| GB | 1189746 | 4/1970 |
| JP | 1978-122691 | 10/1978 |
| JP | 1982-150481 | 9/1982 |
| JP | 1983-45705 | 3/1983 |

(Continued)

OTHER PUBLICATIONS

J. Takahashi, et al, Preparation of Titania Colloids by Thermal Hydrolysis of Urea and Densification Behavior of the Colloid–Derived Monolithic Titania Gels, Journal of Sol–Gel Science and Technology, 4, 15–21 (1995).

Werner Heyne, Untersuchungen Zur Reinigung von Gruber-wässem Des Uranbergbaus An Regenerierbaren Adsorbem,. Insbesondere Titanoxidhydrat, Verein fur Kernverfahren-stechnik und Analytik Rossendorf e. V., 255–262 (1995).

Qing–Hong Zhang, et al.; Abstract of "Heterogeneous photocatalytic reaaction of Cr(VI) reduction on nanosized titania," Gaodeng Xucxiao Huaxue Xuebao (2000), 21(10), 1547–1551.

(Continued)

Primary Examiner—Robert A. Hopkins
(74) Attorney, Agent, or Firm—McCarter & English, LLP

(57) ABSTRACT

A method for producing a surface-activated crystalline titanium oxide product having a high adsorptive capacity and a high rate of adsorption with respect to dissolved contaminants includes the steps of preparing a titanium oxide precipitate from a mixture comprising a hydrolysable titanium compound and heating the precipitate at a temperature of less than 300° C., without calcining the precipitate. Preferably, the titanium oxide product includes crystalline anatase having primary crystallite diameters in the range of 1–30 nm. The surface-activated crystalline titanium oxide product is used in methods to remove dissolved inorganic contaminants from dilute aqueous streams by suspending the product in an aqueous stream or by filtering an aqueous stream through a bed of the product. In another method, a hydrolysable titanium compound is added to an aqueous stream so that titanium oxides form as a co-precipitate with dissolved contaminants within a bed of particulate material.

45 Claims, 11 Drawing Sheets

FOREIGN PATENT DOCUMENTS

| WO | 0046154 | 8/2000 |
| --- | --- | --- |
| WO | 0149613 | 7/2001 |
| WO | WO 01/83376 A2 | 11/2001 |
| WO | WO 02/053262 A1 | 7/2002 |
| WO | 0282463 | 10/2002 |

OTHER PUBLICATIONS

Dong–Seok Seo, et al.; Abstract of "Preparation of TiO2 nanocrystallie powder at low temperature," Han'guk Scramik Hakhoechi (2001), 384(4), 331–336.

Dong–Seok Seo, et al.; Abstract of "Synthesis of TiO2 nanocrystalline powder by aging at low temperature," Journal of Crystal Growth (2001), 233(1–2), 298–302.

Dong–Seok Seo, et al.; Abstract of "Effect of aging agents on the formation of TiO2 nanocrystalline powder," Materials Letters (2001), 51(2), 115–119.

Dong–Seok Seo, et al.; Abstract of "Influence of treatment conditions on crystallization and microstructure of TiO2 nanocrystalline powder," Advances in Technology of Materials and Materials Processing Journal (2003), 5(2), 114–118.

R. Flaig–Baumann, et al.; Abstract of "Surface chemistry of titanium dioxide. III. Surface reactions of basic hydroxyl group," Zeitschrift fuer Anorganische und Allegemenie Chemie (1970), 372(3), 296–307.

R. Flaig–Baumann, et al.; Abstract of "Amphoteric properties of metal oxide surfaces," Fortschrittsberichte ueber Kolloide und Polymere (1971), 55 7–15.

Toshio Ashitani, et al.; Abstract of "Composite inorganic oxide adsorbent for anions removal from polluted water and its preparations," Jpn. Kokai Tokkyo Koho (2000), 6 pp.

Hiroshi Sato, et al.; Abstract of "Removal of arsenic from mine drainage wastewater," Jpn. Kokai Tokkyo Koho (1979), 5 pp., Patent No. JP 54108463, 19790825.

S.A. Onorin, et al.; Abstract of "Preparation effects on the structure and ion exchange properties of hydrated titanium dioxide," Zhurnal Neorganicheskol Khimii (1992), 37(6), 1218–22.

V.V. Vol'khin, et al.; Abstract of "Sorption properties of hydrated titanium dioxide and its deydration products," Izvestiya Akademii (Nauk SSSR, Neorganicheskle Materialy (1976), 12(8), 1415–18.

S.A. Onorin, et al.; Abstract of Physiocochemical study of hydrated titanium dioxide and its arsenic(V) and sodium (1+) sorption products, Zhurnal Neorganicheskoi Khimii (1992), 37(6), 1223–7.

G.R. Chumakova, et al.; Abstract of "Removal of arsenic and antimony from solutions with titanium hydroxide oxide," Tsvetnye Metally (Mosow, Russian Federation) (1984) (2), 21–3.

S.A. Onorin, et al.; Abstract of "Granulated sorbent based on titanium hydroxide," Russian Patent No. SU 1150024,19850415.

H. Yang, et al.; Abstract of "Homogeneous and heterogeneous photocatalytic reactions involving As(III) and As(V) species in aqueous media," Journal of Photochemistry and Photobiology,A: Chemistry (1999), 123(1–3), 137–143.

Mitsuo Abe, et al.; Abstract of "Environmental Application of Hydrous Titanium Dioxide as Inorganic Ion Exchanger," 6th Symposium on Ion Exchange, Balatonfured, Hungary, Sep. 3–7, 1990.

Monique Bissen, et al.; TiO2–catalyzed photooxidation of arsenite to arsenate in aqueous samples, Chemosphere 44 (2001) 751–757.

Mitsuo Abe, et al.; Adsorption and Desorption Behaviour of Arsenic Compounds on Various Inorganic Ion Exchangers, Ion Exchange Advances, 326–333.

Russell Paterson, et al.; "Thermodynamics of ion exchange on microcrystals of hydrous oxides," Ion Exchange Technology, Society of Chemical Industry (1984), 276–283.

Michael R. Prairis, et al.; "An Investigation of TiO2 Photocatalysis for the Treatment of Water Contaminated with Metals and Organic Chemicals," Environ. Sci.Technol. 1993, 27, 1776–1782.

J. Sabate, et al.; "Comparison of TiO2 powder suspensions and TiO2 ceramic membranes supported on glass as photocatalytic systems in the reduction of chromium (VI)," Journal of Molecular Catalysis, 71 (1992), 57–68.

JacobA A. Marinsky, et al.; "New Inorganic Ion Exchangers," Ion Exchange and Solvent Extraction, 92–120.

Tatineni Balaji, et al.; "Adsorption Characteristics of As(III) and As(V) with Titanium Dioxide Loaded Amberlite XAD–7 Resin," Analytical Sciences, Dec. 2002, vol. 18, 1345–1349.

Kerr–McGee Chemicals LLC Product Data Sheet for Tronox Hydrate Paste.

Kemira Pigment Oy Product Data Sheet for FINNTi S130 Jul. 2004.

Mudanjiang Fengda Chemicals Product Data Sheet for titanium dioxide Feb. 1, 2005.

\* cited by examiner

METHODS OF PREPARING A SURFACE-ACTIVATED TITANIUM OXIDE PRODUCT AND OF USING SAME IN WATER TREATMENT PROCESSES

CROSS-REFERENCE TO RELATED APPLICATION

This application claims the benefit of U.S. Provisional Patent Application No. 60/357,051, filed Feb. 14, 2002.

FIELD OF INVENTION

The present invention relates to products and methods for removing dissolved contaminants from aqueous streams. More particularly, the present invention relates to methods of removing dissolved inorganic contaminants from aqueous streams using metal oxides as co-precipitants and/or adsorbents.

BACKGROUND OF INVENTION

Wastewater and natural waters (e.g., surface water or groundwater) may contain a variety of dissolved inorganic substances from natural and anthropogenic sources. Regulatory limits have been set for a number of these substances in drinking water and for discharges to natural waters, for protection of public health and of environmental quality. The regulatory limits for many of these substances are set at very low levels, e.g., in the range of 2–50 parts-per-billion ("ppb") or the equivalent units of measure of micrograms-per-liter ("$\mu$g/L").

Conventional water treatment processes, such as co-precipitation with iron or aluminum salts, lime softening, or filtration using adsorbents or ion exchange resins, are ineffective in removing some of these regulated substances to the mandated levels. This problem is of particular concern with respect to certain types of substances including oxyanions, particularly arsenate and arsenite, and some metals, such as mercury, because of their chemistry in water and the particularly low regulatory limits that have been set for them. Typically, the removal of such contaminants can be improved by selecting a treatment matrix (e.g., a co-precipitant or adsorbent) that exhibits a greater capacity to sequester or retain the dissolved substance of concern, or provides more favorable kinetics toward that substance (i.e., the treatment reaction proceeds more quickly). The low capacity or unfavorable kinetics of a treatment matrix can be accommodated to some extent by construction of larger treatment systems to allow the use of larger quantities of the treatment matrix or to provide longer contact times between the treatment matrix and the aqueous stream undergoing treatment. The costs of building and operating such a system increases with the size of the system and often causes such an accommodation to become uneconomical.

A considerable amount of research has been performed to develop metal oxide compounds that can be used economically to attain the low concentrations of dissolved inorganic substances required under current regulations. Some of this research has been directed toward the use of titanium oxides.

U.S. Pat. No. 6,383,395 discloses the use of powdered titanium hydroxide, packed in a column or applied to a filter in the form of a paste, to remove dissolved oxyanions, particularly arsenate, from water.

U.S. Pat. No. 5,618,437 discloses the use of a hydrous titanium oxide dispersed on the surface of a metal oxide supporting matrix to remove dissolved sulfate from a brine.

U.S. Pat. No. 3,332,737 discloses the use of hydrous titanium oxides in packed columns to adsorb several dissolved metals. The hydrous titanium oxides are prepared by treating a solution of a hydrolysable titanium compound with aqueous ammonia or hydrogen peroxide.

Japanese Patent Application Publication 58-45705 discloses the use of hydrous titanium oxides in a slurry to remove oxyanions, such as arsenate, from water at concentrations in the parts-per-billion (ppb) range. The hydrous titanium oxide adsorbent is prepared from a precipitate of a hydrolyzed titanium salt. It is noted in Publication 58-45705 that the kinetics of adsorption are relatively slow, and that a contact time roughly five times as long is required to remove the same amount of arsenate from solution in the absence of certain non-oxygenated acidic anions, such as chloride or sulfide, as when the acidic ions are present.

Japanese Patent Application Publication 57-150481 discloses the removal of arsenate from water by co-precipitation with hydrous titanium oxides. The co-precipitated solids are separated from the aqueous stream after the hydrolysis and co-precipitation reactions have proceeded to completion.

Japanese Patent Application Publication 53-122691 discloses the preparation and use of a composite adsorbent comprising a granular activated carbon and hydrous titanium oxides. The composite adsorbent is prepared by boiling the granular activated carbon in a concentrated solution of a titanium salt in the presence of an oxidative acid, then washing and air-drying the resulting composite adsorbent.

SUMMARY OF THE INVENTION

In a first aspect, the present invention comprises a method for preparing a surface-activated crystalline titanium oxide product having a high adsorptive capacity and a high rate of adsorption with respect to dissolved inorganic contaminants. A preferred embodiment of the method includes the steps of preparing a titanium oxide precipitate from a mixture comprising a hydrolysable titanium compound and heating (or drying) the titanium oxide precipitate at a selected drying temperature of less than 300° C; preferably, a temperature between about 100° C. and 150° C.; or, more preferably, a temperature of about 105° C. The preferred method of preparing the surface-activated crystalline titanium oxide precipitate does not include a calcining step. A preferred embodiment of the method produces a nano-crystalline anatase, i.e., a titanium oxide product having anatase crystals with mean primary crystallite diameters within the range of about 1 nm to about 30 nm; preferably, within the range of about 1 nm to about 10 nm.

A second aspect of the present invention comprises a method for removing dissolved inorganic contaminants from a dilute aqueous stream, which method includes the step of contacting a surface-activated crystalline titanium oxide product with such a dilute aqueous stream. Such dissolved inorganic contaminants include arsenite, arsenate, cadmium, chromium, copper, lead, mercury, tungsten, uranium, and zinc, and low-molecular weight organic arsenic compounds, such as monomethylarsonic acid, dimethylarsinic acid, or phenylarsonic acid. The surface-activated crystalline titanium oxide product, preferably comprising a nano-crystalline anatase, may be in a powdered form, in a granular form comprising one or more binders, in the form of a coating on a substrate, or in other forms that will be obvious to those having ordinary skill in the relevant arts. In a preferred embodiment of the method, the surface-activated crystalline titanium oxide product is suspended in the dilute aqueous stream to provide the necessary contact. In another preferred embodiment, the dilute aqueous stream is filtered through a bed of surface-activated crystalline titanium oxide product; such bed being in a vessel (e.g., a packed column) or in the ground for treatment of groundwater or surface water.

A third aspect of the invention comprises a method for preventing the dissolution or migration of inorganic contaminants in groundwater by injecting a solution of a hydrolysable titanium compound into an aquifer so as to precipitate a titanium oxide product therein.

In a fourth aspect, the invention comprises a method for removing dissolved inorganic contaminants from an aqueous stream, such method including the steps of adding a hydrolysable titanium compound to an aqueous stream, co-precipitating a hydrolyzed titanium compound with such inorganic contaminants, and, concurrently with the co-precipitation step, filtering the co-precipitate from the dilute aqueous stream using a packed bed filter.

A fifth aspect of the invention comprises a method for preparing a packed bed to remove dissolved inorganic contaminants from a dilute aqueous stream by infiltrating a solution of a hydrolysable titanium compound into the packed bed so that that titanium oxides precipitate within the packed bed material.

BRIEF DESCRIPTION OF THE DRAWINGS

For a more complete understanding of the present invention, reference is made to the following detailed description of the present invention considered in conjunction with the accompanying drawings, in which.

DETAILED DESCRIPTION OF THE INVENTION

The present invention comprises methods for producing surface-activated crystalline titanium oxide products and methods for using such products to remove dissolved inorganic substances from water. The term "surface-activated" refers to the high adsorptive capacities and favorable adsorption kinetics of the titanium oxide products, which lead to high rates of removal for dissolved arsenate, arsenite, low-molecular weight organic arsenic compounds, metals and other dissolved inorganic substances. The "titanium oxide" of the present invention may be primarily, or entirely, comprised of titanium dioxide, or other titanium oxides and hydroxides may be present in the product.

The primary commercial use of titanium dioxide is as a white pigment in a wide range of products. The pigments generally contain one of the two primary crystalline forms of titanium dioxide, anatase and rutile. Both of these forms have the chemical composition $TiO_2$, but have different crystalline structures. Industrial processes that produce anatase and rutile typically use a sulfate process, such as the industrial process illustrated in FIG. 1. A chloride process (not shown) is also used for commercial production of rutile. Although it is not impossible to obtain anatase by a chloride process, the thermodynamics of the process make it significantly more applicable to the production of rutile.

Figures 1, 2:
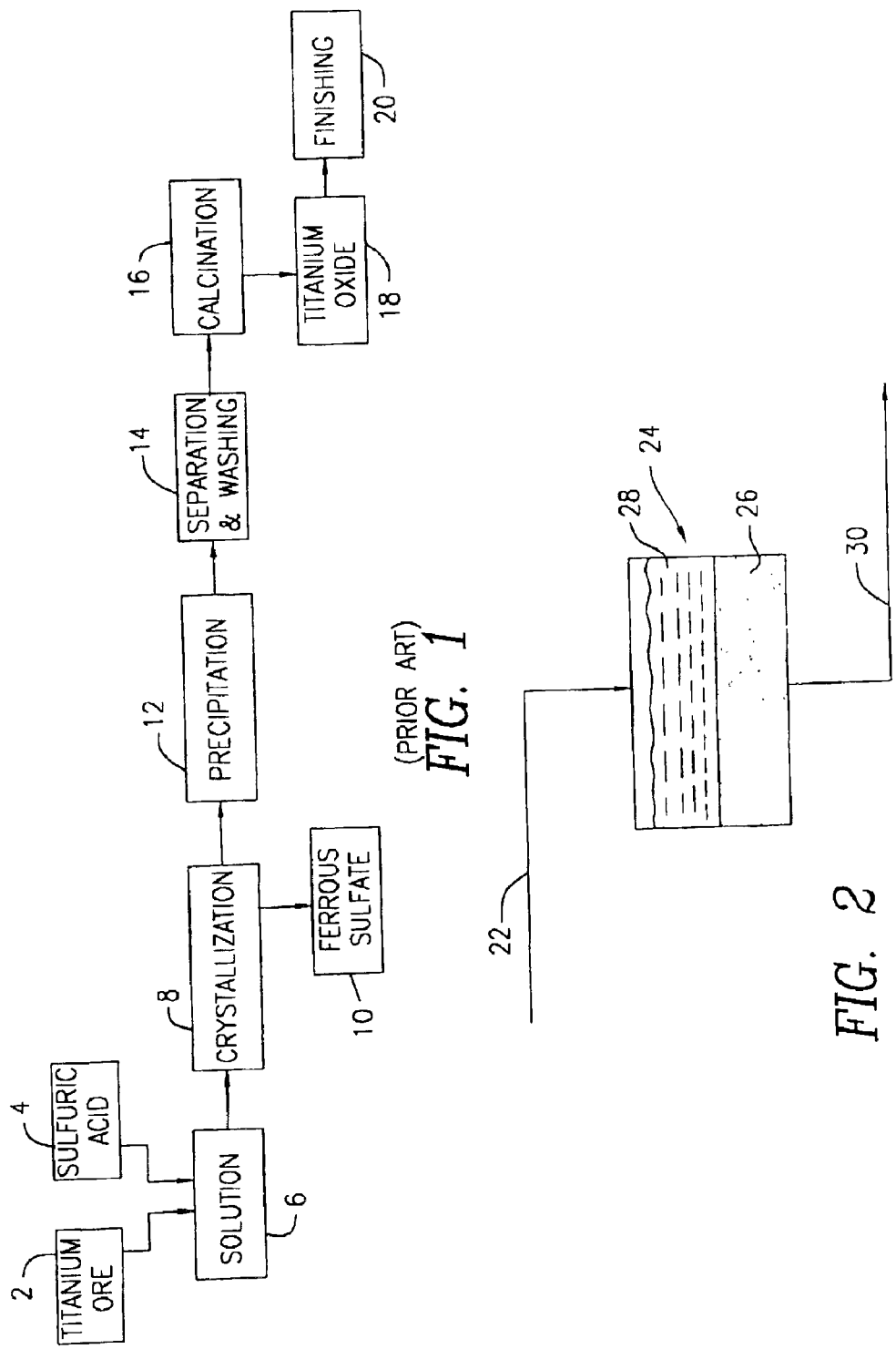
FIG. 1 is a block flow diagram of an industrial process for producing titanium oxides, such as anatase, by a sulfate process.
FIG. 2 is a schematic diagram of a packed bed filtration process implemented according to the present invention.

Referring to FIG. 1, titanium ore 2 (typically, ilmenite) is digested with sulfuric acid 4 at temperatures greater than 100° C., then leached with water or dilute acid to produce a solution 6 of titanium sulfate and iron sulfates, also referred to as a "black liquor". The solution 6 is cooled to a temperature of about 65° C. and clarified, and iron sulfates are separated from the solution 6 by crystallization 8. Scrap iron may be added at this stage of the process to reduce ferric sulfate to the less soluble ferrous sulfate 10, thus promoting separation of the iron sulfates by crystallization 8. The hydrolysis of the titanium sulfate is performed next, typically in the same stage as the precipitation 12 of the titanium oxide. Precipitation 12 is achieved by boiling the solution 6 for a number of hours. The conditions of precipitation 12 are controlled so that the precipitate can be easily filtered and washed 14, and to produce crystals that will have the correct crystal structure and crystallite size after calcination 16. The washing step 14 removes any soluble metal salts that may remain and reduces the sulfuric acid content of the resulting slurry. During calcination 16, the titanium oxide slurry is heated to temperatures in the region of 700–1000° C. in air to drive off water and sulfur oxides, and to control the crystal size of the titanium oxide 18 produced. The final stages of calcination 16 may be performed so as to convert the crystalline product to rutile structure. The resulting titanium oxide 18 is then finished 20 in a series of processes that provide the desired properties to the titanium oxide product.

In a process for preparing a surface-activated crystalline titanium oxide product according to the present invention, the titanium oxide slurry from the separation and washing step 14 is treated with sodium hydroxide to adjust its pH toward 7. The neutralized titanium oxide contains salts, typically sulfates, which fill a portion of the pore space of the titanium oxide solids, but which may be removed by washing the solids with water or with a dilute acid to improve the adsorptive properties of the surface-activated crystalline titanium oxide product. The solids are then dried under air or steam at a selected temperature between about 50° C. and about 800° C. The drying temperature is selected to produce a product containing titanium oxide crystals having a desirable crystallite diameter and surface activity, which may be expressed as the number of available surface hydroxyl groups per mass of titanium oxide. Smaller crystallite diameters, preferably in the nano-crystallite range of 1–30 nm, or, more preferably, between about 1 nm and about 10 nm, are achieved at the lower drying temperatures. As disclosed in the subsequent Examples, the preferred drying temperatures are in the range of about 100° C. to about 300° C.; more preferably, at about 105° C. The selected drying temperatures are maintained for 2 hours or less, producing a surface-activated titanium oxide product comprising functional nano-crystalline titanium oxide. The drying stage of the present invention differs from the calcination stage that is typically present in processes for producing titanium oxide catalysts or pigments. The temperature of the drying stage of the present invention is selected to remove free water from the product, while the temperature of the typical calcination stage is selected to drive off sulfur oxides and other residues that may be bound to the product. Drying the product at temperatures higher than 300° C. dramatically impairs the adsorptive properties of the surface-activated crystalline titanium oxide product. No calcination stage is present in the methods disclosed herein of producing surface-activated crystalline titanium oxide products.

Surface-activated crystalline titanium oxide products may also be produced from hydrolysable titanium compounds. The preferred hydrolysable titanium compounds for the present invention include the following inorganic compounds: titanium trichloride, titanium tetrachloride, titanyl sulfate, titanium sulfate, titanium oxysulfate, titanium iron sulfate solution, and titanium oxychloride. Titanium alkoxides may also be used: such as, titanium ethoxide, titanium ethylhexoxide, titanium isobutoxide, titanium isopropoxide, titanium isopropylate or titanium methoxide. The inorganic titanium compounds are preferred as precursor compounds for large-scale production of the surface-activated crystalline titanium oxide product, as the organic titanium compounds are substantially more expensive and hydrolysation of the organic compounds generates an organic wastewater stream that must be treated prior to discharge.

In general, a surface-activated crystalline titanium oxide is produced by adding water to a hydrolysable titanium compound (e.g., to form an aqueous solution of the hydrolysable titanium compound) and maintaining the resulting mixture at a temperature between about 50° C. and about 180° C. for a period of about 2 hours or longer. A more preferred temperature range is between about 80° C. and about 120° C. The selection of an optimum temperature for hydrolysis within these ranges depends on the hydrolysable titanium compound used as a starting material and the desired crystallite diameter of the precipitate after drying. For example, a solution of titanium oxysulfate may be maintained at a temperature between about 80° C. and about 110° C. to produce a precipitate that has a crystallite diameter between about 6 nm and about 8 nm after drying. Under some conditions, the titanium oxide will precipitate in an amorphous form (e.g., as a gel) rather than in a crystalline form. The amorphous product may be dried to form the surface-activated crystalline titanium oxide and washed subsequently, if desired.

Other surface-activated crystalline titanium oxide products also may be produced in accordance with the present invention. For example, a particulate substrate, such as granular activated carbon or alumina, may be coated with a surface-activated crystalline titanium oxide by contacting the particulate substrate with the mixture of the hydrolysable titanium compound and water under controlled conditions to precipitate the titanium oxide onto the surface or into the pores of the particulate substrate. For another example, the dried surface-activated crystalline titanium oxide product may be powdered, and the powder reconstituted in a granular form with one or more binders. This reconstitution would facilitate the formation of granules having selected adsorptive and/or structural properties. Preferred binders for the surface-activated crystalline titanium oxides of the present invention include silicates, substituted celluloses, vinyl polymers and water. More preferred binders include sodium silicate, hydroxyethyl cellulose, polyvinyl alcohol and polyvinyl acetate.

As disclosed in the Examples below, the surface-activated crystalline titanium oxide product of the present invention has a high adsorptive capacity and favorable adsorption kinetics for removing oxyanions, such as arsenate and arsenite, dissolved metals, and some low-molecular weight organic compounds at low concentrations in water, which properties lead to high rates of removal for those substances. The surface-activated crystalline titanium oxide product may be used to substantially reduce the concentrations of such substances to concentrations below a few micrograms-per-liter ($\mu$g/L). Substances which may be effectively adsorbed by a surface-activated crystalline titanium oxide product include aluminum, antimony, arsenic(III), arsenic (V), barium, cadmium, cesium, chromium, cobalt, copper, gallium, gold, iron, lead, manganese, mercury, molybdenum, nickel, platinum, radium, selenium, silver, strontium, tellerium, tin, tungsten, uranium, vanadium, zinc, nitrite, phosphate, sulfite, sulfide, and low-molecular weight organic arsenic compounds, such as monomethylarsonic acid, dimethylarsinic acid and phenylarsonic acid. In particular, the surface-activated crystalline titanium oxide product is effective in adsorbing arsenite (As(III)), arsenate (As(V)) and the dissolved metals: cadmium, chromium, copper, lead, mercury, tungsten, uranium and zinc The preferred methods of making surface-activated crystalline titanium oxide that are described above, consistently produce a product that consists predominantly, if not entirely, of anatase crystals having crystallite diameters in the range of about 1 to about 30 nm. For the purposes of reference and discussion, such titanium oxide products will be referred to hereinafter as "nano-crystalline anatase" products.

Dissolved inorganic substances may be removed from a dilute aqueous stream by contacting the dilute aqueous stream with a surface-activated crystalline titanium oxide product for a period of time. Preferably, the surface-activated crystalline titanium oxide product comprises a nano-crystalline anatase, which material is particularly effective in removing arsenic and dissolved metals from water, as disclosed herebelow in the Examples. For convenience, the following methods of removing dissolved inorganic substances from water are discussed with respect to the use of nano-crystalline anatase. However, any surface-activated crystalline titanium oxide product may be used according to the methods hereinafter disclosed.

A dilute aqueous stream may be contacted with nano-crystalline anatase product by known water treatment processes, e.g., suspending a powdered nano-crystalline anatase in a batch or a stream of contaminated water for a period of time, then separating the anatase solids from the water, or by filtering the dilute aqueous stream through a bed or column of the nano-crystalline anatase product. The nano-crystalline anatase product used in water treatment processes may be in a powdered or granular form; it may be dispersed in a bed of a particulate substrate; or it may adhere to the surface or be within the pores of a particulate substrate such as granular activated carbon or porous alumina.

Referring to FIG. 2, an influent stream 22 of water containing dissolved inorganic contaminants is discharged to a vessel 24 containing a bed 26 of a nano-crystalline anatase product. The vessel 24 may provide space for a reservoir 28 of water above the bed 26 to provide a pressure head for gravity filtration, or the filtration process may be driven by pressurizing the influent stream 22 and the vessel 24. The nano-crystalline anatase product in the bed 26 adsorbs the inorganic contaminants from the water, resulting in an effluent 30 having substantially lower concentrations of dissolved inorganic contaminants than are present in the influent stream 22. Because of the high adsorptive capacity and favorable adsorption kinetics of the nano-crystalline anatase product, the bed 26 will achieve much greater removals of dissolved contaminants than a conventional metal oxide product in a bed of comparable size.

Figure 3:
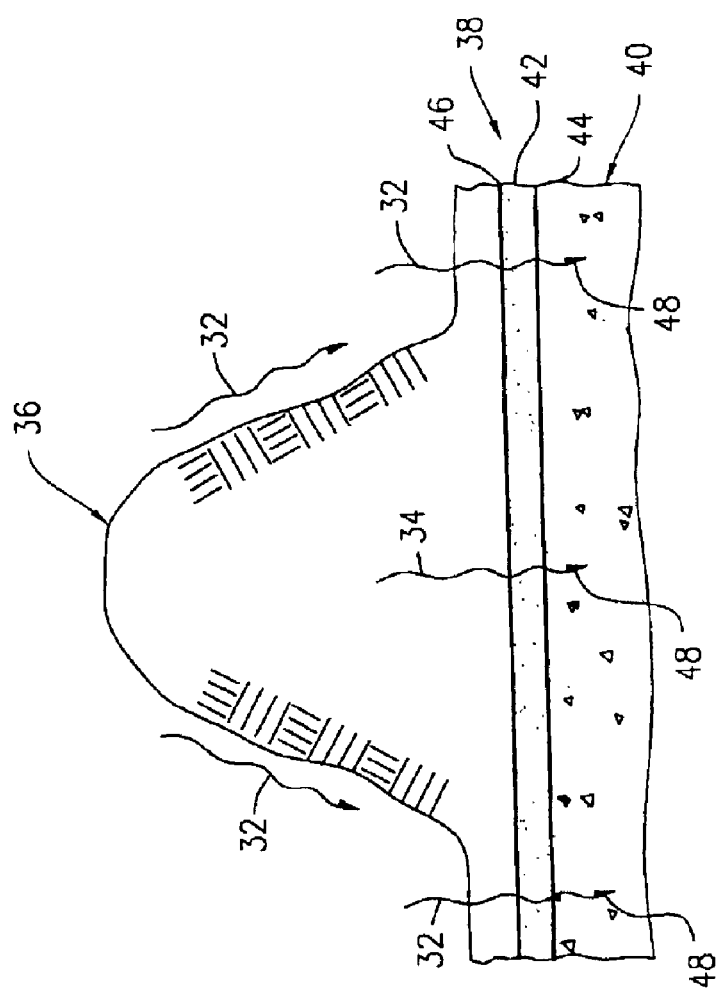
FIG. 3 is a schematic diagram of an in-ground filtration system implemented according to the present invention to remove dissolved contaminants from infiltrating surface water.

Referring to FIG. 3, contaminated surface runoff 32 and percolating water 34 from a heap or berm 36 of contaminated soil may be filtered through an in-ground bed 38 of nano-crystalline anatase product to adsorb dissolved inorganic contaminants, thereby reducing the contaminant load that infiltrates the underlying layer 40 of gravel or crushed stone, and migrates from there into deeper soils. The in-ground bed 38 comprises a layer 42 of nano-crystalline anatase contained between a lower water-permeable geotextile layer 44 that overlies the layer 40 of gravel or crushed stone, and an upper water-permeable geotextile layer 46. Runoff 32 or percolating water 34 may become contaminated by dissolution of inorganic contaminants present in the contaminated soil of the heap or berm 36. The runoff 32 and percolating water 34 infiltrate the layer 42 of nano-crystalline anatase, which adsorbs the dissolved inorganic contaminants, producing an infiltrating water 48 that carries a substantially reduced load of dissolved inorganic contaminants in comparison to the surface water 32 or percolating water 34.

Figure 4:
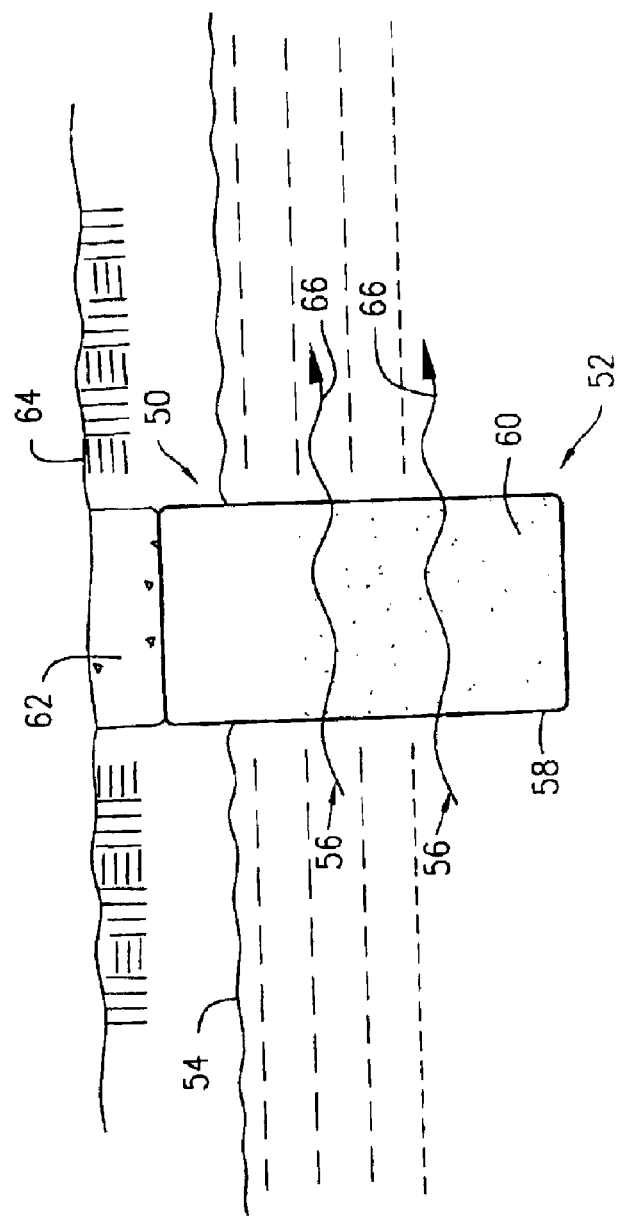
FIG. 4 is a schematic diagram of an in-ground filtration system implemented according to the present invention to remove dissolved contaminants from groundwater.

Referring to FIG. 4, a bed 50 of a nano-crystalline anatase product may be installed in a trench 52 beneath the groundwater table 54 to intercept and filter a plume 56 of dissolved inorganic contaminants. The bed 50 is formed by lining the trench 52 with a water-permeable geotextile 58, filling the lined trench 52 with a material 60 comprising a nano-crystalline anatase product, and wrapping the geotextile 58 to cover the top of the bed 50. A low-permeability fill material 62 may be installed over the bed 50 to divert surface water away from the trench 52 and provide a continuous surface with the ground surface 64. As the plume 56 of dissolved inorganic contaminants filters through the bed 50, the material 60 adsorbs the dissolved inorganic contaminants from the plume 56, resulting in substantially lower concentrations of those contaminants in the groundwater 66 exiting the bed 50.

Hydrolysable titanium compounds may also be used to treat soil or water by forming titanium oxides in situ within soil or within a packed bed filter, where the titanium oxides act to sequester dissolved inorganic contaminants through co-precipitation and adsorption and/or adsorb dissolved inorganic contaminants from water that subsequently passes through the treated volume of the soil or filter material.

Figure 5:
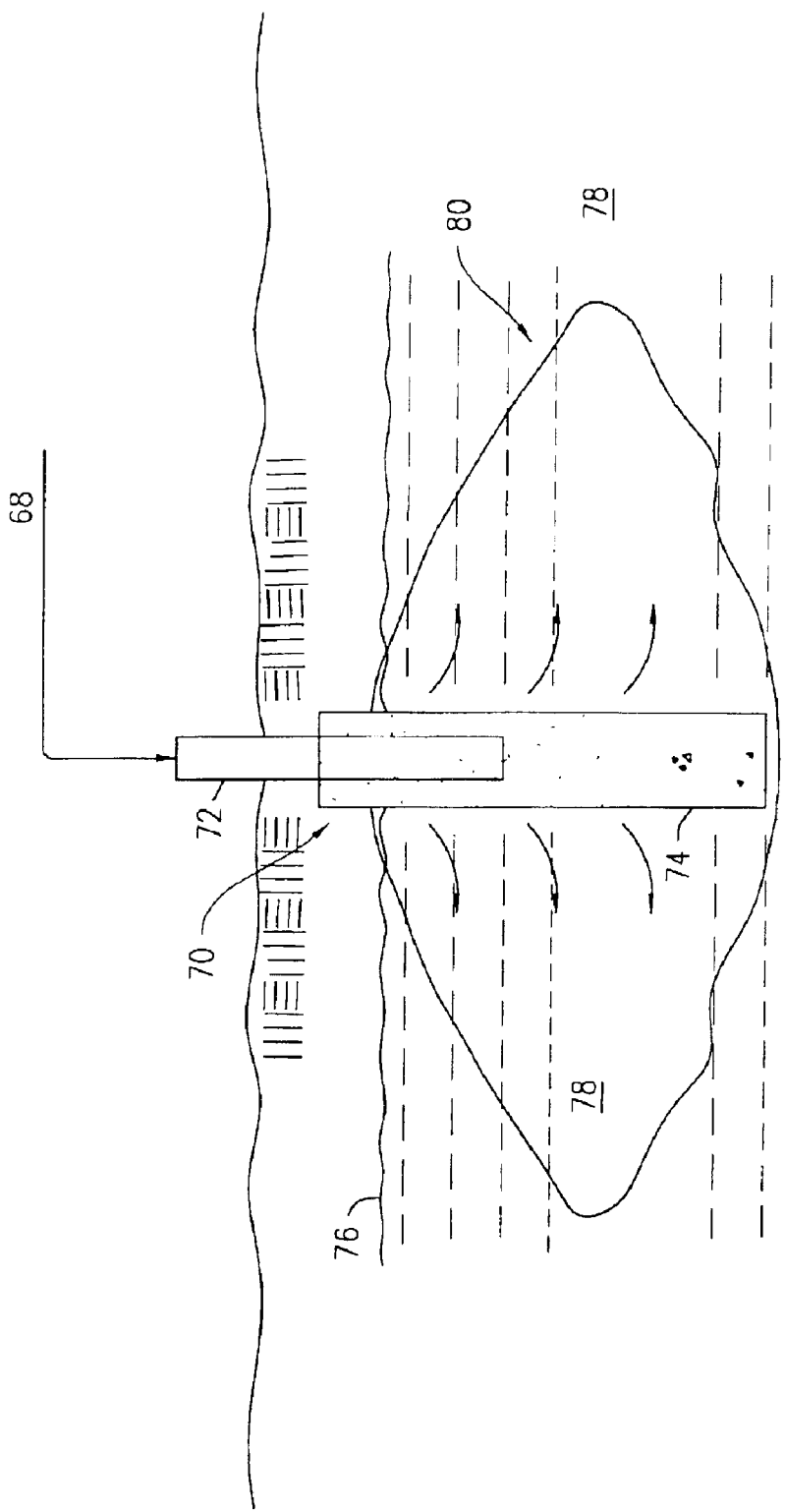
FIG. 5 is a schematic diagram of an in-ground injection system implemented according to the present invention to filter contaminants from groundwater and/or fix contaminants in soil.

Referring to FIG. 5, a solution 68 comprising a hydrolysable titanium compound is injected into the soil 78 through an injection well 70 comprising an injection pipe 72 that extends into a gravel-packed boring 74 beneath the groundwater table 76. The solution 68, preferably, has an acidic pH of about 2 to about 4 to prevent the dissolved titanium compound from hydrolyzing before it is injected. The solution 68 flows out of the boring 74 into the surrounding soil 78, where dilution in the ground water and ion exchange with the surrounding soil raise the pH of the mixture. As the pH of the injected solution 68 increases, the dissolved titanium compound hydrolyzes, precipitating titanium oxides into the soil 78 within a treated volume 80. The titanium oxides retard dissolution of inorganic contaminants in the soil 78 and adsorb dissolved inorganic contaminants from groundwater flowing through the treated volume 80.

Figure 6:
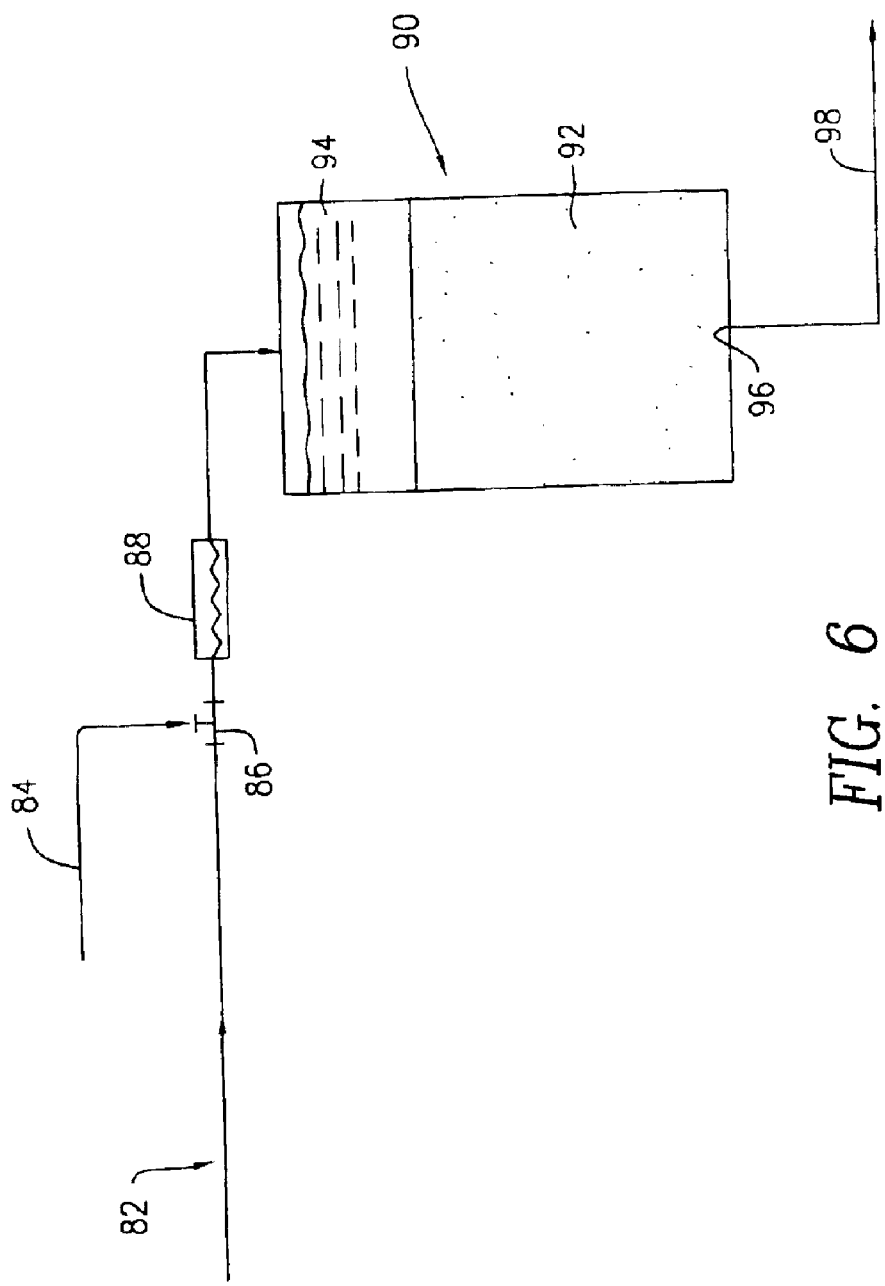
FIG. 6 is a schematic diagram of a co-precipitation/direct filtration process implemented according to the present invention.

Referring to FIG. 6, dissolved inorganic contaminants can be removed from an aqueous stream 82 by co-precipitation and direct filtration. As described in U.S. patent application Ser. No. 10/049,107, which is owned by the Assignee of the present application and the disclosure of which is hereby incorporated herein by reference, the co-precipitation/direct filtration process comprises the injection of a co-precipitant 84 into the aqueous stream 82, followed by filtration of the aqueous stream 82 through a packed bed filter 92 without an intervening co-precipitation or settling vessel. In the present invention, the co-precipitant 84 comprises a hydrolysable titanium compound in solution or slurry form injected into the aqueous stream 82 at an injection point 86. An inline mixer 88 may be provided to mix the co-precipitant 84 into the aqueous stream 82, or mixing may occur through turbulent flow downstream of the injection point 86. The vessel 90 contains a packed bed 92 of a particulate material, e.g., a silicate sand. The vessel 90 may also provide space for a reservoir 94 of water above the packed bed 92 to provide a pressure head for gravity filtration, or the filtration may be driven by pressurizing the influent stream 82 and the vessel 90. The injection point 86 is positioned upstream of the vessel 90 so that the total detention time of the aqueous stream 82 downstream of the injection point 86 is slightly more than the time required for the titanium compound to completely hydrolyze and co-precipitate with the dissolved inorganic contaminants. The detention time is the time required for a fixed volume of the aqueous stream to flow from the injection point 86 to the point 96 where the aqueous stream exits the packed bed 92. Preferably, the detention time for a hydrolysable titanium compound is less than 10 minutes, or, more preferably, less than 7 minutes. Because of the short detention time, a substantial portion of the co-precipitant hydrolyzes within the packed bed 92, rather than in the reservoir 94, so that the titanium oxide is distributed among the particulate material of the packed bed 92. The titanium oxide within the packed bed continues to adsorb dissolved contaminants from the aqueous stream 82, further decreasing the concentrations of such contaminants in the effluent stream 98.

A variation of the method described immediately above may be used to prepare a packed bed 92 with a titanium oxide adsorbent. A solution 84 of a hydrolysable titanium compound is infiltrated directly into a packed bed 92, preferably at a neutral pH. The infiltration step is complete when the entire volume of the packed bed 92 has been filled with the solution 84, after which the hydrolysation of the titanium compound is allowed to proceed to completion. For some applications, it may be desirable to control the temperature of the packed bed 92 to control the distribution and/or crystallite diameter of the titanium oxide within the packed bed 92. Preferably, in such applications, the temperature of the packed bed 92 would be controlled at a temperature greater than 50° C.

The hydrolysable titanium compounds preferred for use in the embodiments of FIGS. 5 and 6 include the following inorganic compounds: titanium trichloride, titanium tetrachloride, titanyl sulfate, titanium sulfate, titanium oxysulfate, titanium iron sulfate solution, and titanium oxychloride. Titanium alkoxides may also be used, such as, titanium ethoxide, titanium ethylhexoxide, titanium isobutoxide, titanium isopropoxide, titanium isopropylate or titanium methoxide.

The following examples are intended to aid in the understanding of the methods and products of the present invention and are not intended, to limit the scope or spirit of the invention in any way.

EXAMPLE 1

Preparation and Characterization of a Surface-activated Titanium Oxide Product A powdered surface-activated titanium oxide product was prepared from a titanium oxide intermediate obtained from a commercial sulfate process used primarily to produce titanium dioxide pigments. The titanium oxide intermediate was collected as an acidic slurry after a separation and washing stage 14, but before a calcination stage 16 (see FIG. 1). The pH of the slurry was adjusted to a pH between 4 and 9 with sodium hydroxide, and the slurry was filtered to collect the titanium oxide solids. The titanium oxide solids were washed with water to remove salts, then dried at a selected temperature between about 105° C. and about 700° C. for about 2 hours. Samples of the dried titanium oxide product were powdered and sieved to obtain a 100-standard U.S. mesh fraction (i.e., a fraction having a mean particle diameter of about 150 $\mu$m).

Step-scanned X-ray powder diffraction data for the powdered samples were collected using an X-ray diffractometer (trademark: Rigaku DXR-3000, Rigaku/MSC Corporation, The Woodlands, Tex.) using Bragg-Brentano geometry, an iron (Fe) anode operating at 40 kV and 30 mA, and a diffracted beam graphite-monochromator. Measurements were taken using a 1° divergence slit and a 0.15 mm receiving slit. FeK$\alpha$ radiation from the Fe anode, i.e., radiation having a wavelength of 1.9373Å, was used as the X-ray source. Data were collected between 15–65° of 2$\Theta$ (where 2$\Theta$ represents two times the angle of Bragg diffraction) with a step size of 0.05° and a count time of 5 seconds per step. Measurements made on silicon powder (NBS 640, a=5.43088) were used to correct the 2$\Theta$ values.

Figure 7:
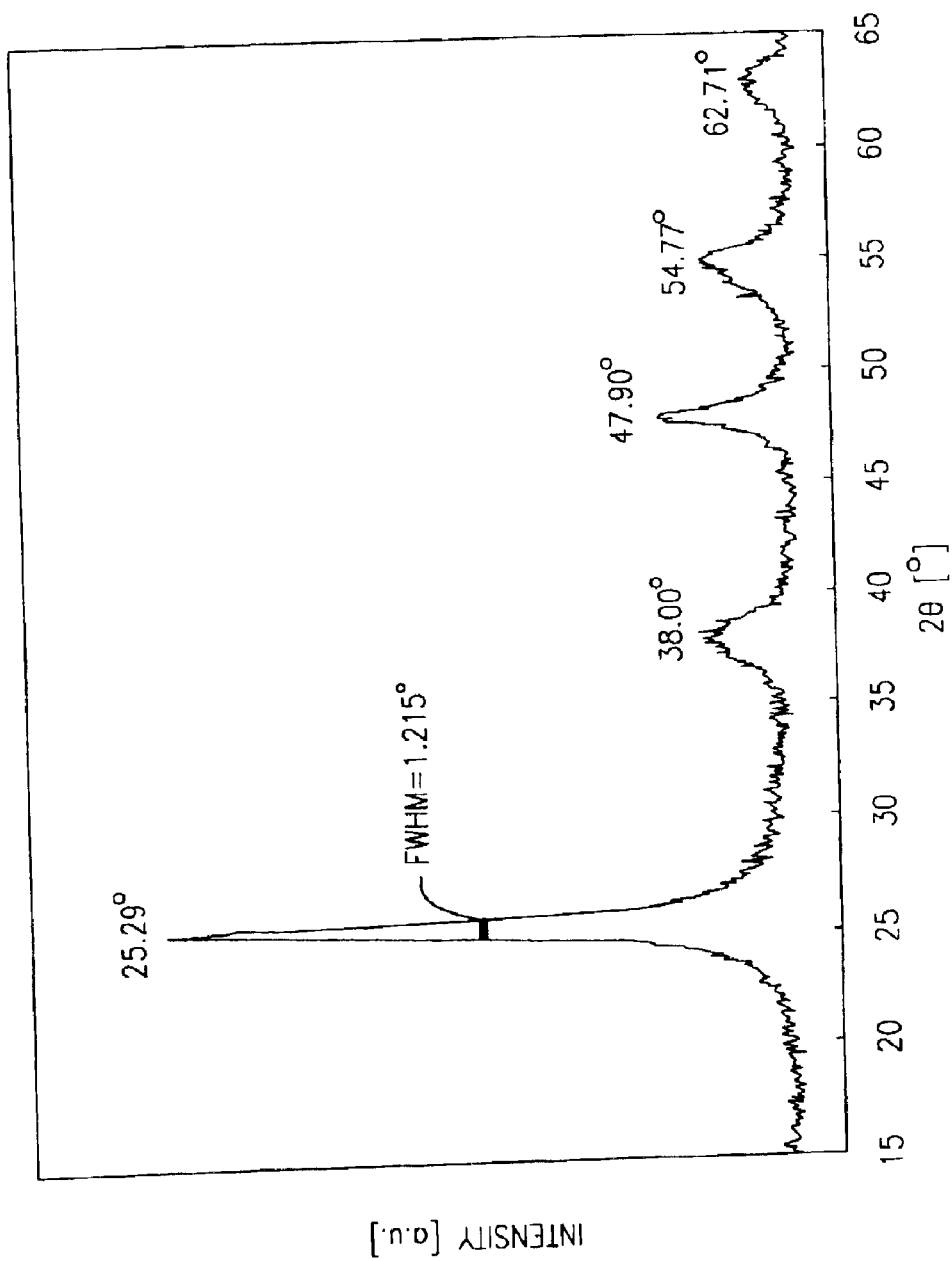
FIG. 7 is an X-ray diffraction spectrograph of a surface-activated crystalline titanium oxide produced according to a method of the present invention.

The X-ray diffraction patterns obtained for the powdered samples included the characteristic peaks of the X-ray diffraction pattern of crystalline titanium dioxide for the FeK$\alpha$ wavelength used. As illustrated in FIG. 7, the characteristic diffraction pattern of crystalline titanium dioxide is a combination of peaks having maxima at 25.29°±0.3°, 38.00°±0.3°, 47.90°±0.3°, 55.77°±0.3° and 62.71°±0.3° of 2$\Theta$, with the most in peak having its maximum at 25.29°±0.3° of 2$\Theta$.

Crystalline interplanar distances (d) were calculated using Bragg's law:

$$2d \sin \Theta = n\lambda$$

where $\Theta$ is the angle of diffraction; n is an integer value; and $\lambda$ is the wavelength of the X-ray source, in this case, $\lambda$=1.9373 Å. Anatase crystals have interplanar distances (d) between 3.45 and 3.60 Å, in contrast, e.g., to rutile crystals which have interplanar distances (d) between 3.20 and 3.30 Å. The calculated interplanar distances (d) for the powdered samples of the titanium oxide product were determined to be within the characteristic range for anatase.

Primary crystallite diameters ($d_0$) were calculated by the Scherrer equation:

$$d_0 = K\lambda/\beta \cos \Theta,$$

where K is a statistically determined pre-factor, in this case, K=0.89; $\lambda$ is the wavelength of the X-ray source, in this case, $\lambda$=1.9373 Å; $\beta$ is the pure full width, expressed in radians, of the peak at 2$\Theta$=25.29° at half of its maximum intensity, in this case, $\beta=((1.215°-1.15°)\times\pi)/180°=0.0186$ radians, where 1.215° is the observed peak broadening, 0.15° is the strain and instrumental peak broadening, and $\pi$=3.14; and $\Theta$ is the Bragg angle of diffraction. The calculated primary crystallite diameters for the titanium oxide product obtained by the Scherrer equation were in the range of about 6.6 nm to about 10.89 nm for samples dried at temperatures between about 105° C. and about 700° C.

The X-ray diffraction spectrograph and the calculated interplanar distances (d) and Scherrer primary crystallite diameters ($d_0$) demonstrate that the granular surface-activated titanium dioxide product formed by the method described above is primarily, if not entirely, comprised of nano-crystalline anatase.

EXAMPLE 2

Porosity and Surface Characteristics of Nano-crystalline Anatase

A sample of powdered nano-crystalline anatase was prepared according to the method of Example 1 and dried at a temperature of 105° C. The BET specific surface area and the porosity of the sample were determined by a static volumetric gas adsorption technique. Measurements were taken using a gas-absorption/desorption analyzer (trademark: ASAP 2010, Micromeritics, Norcross, Ga.). A sample tube containing the sample of nano-crystalline anatase was cooled in liquid nitrogen and evacuated to degas the sample. Measured amounts of nitrogen gas were then introduced and the amount of nitrogen adsorbed by the nano-crystalline anatase was determined at a series of defined pressures. The resulting data, i.e., curves of the volume of nitrogen adsorbed vs. the relative nitrogen pressure, were reduced using the BET equation to determine the BET specific surface area of the sample and using the BJH method to determine pore size distribution. The sample of nano-crystalline anatase was determined to have a BET specific surface area of about 330 m$^2$/gm and a total pore volume of 0.42 cm$^3$/gm for pores with diameters less than 0.63 $\mu$m.

The available surface hydroxyl content, i.e., the number of hydroxyl groups available for chemical reaction, was measured for two samples of nano-crystalline anatase that had been dried at different temperatures. The samples were prepared according to the method of Example 1. One sample was dried at a temperature of 105° C. and the other sample was dried at a temperature of 350° C. The available hydroxyl content was determined by suspending 10 gm of the sample into 200 mL of a 0.01 molar sodium chloride solution, using a continuous nitrogen purge. The pH of the suspension was adjusted to 5.5 and maintained at that level for 1 hour by addition of sodium hydroxide and hydrochloric acid. The suspension was then titrated with 0.2 molar sodium hydroxide to a pH of 12 over a period of three hours. A blank solution of 0.01 molar sodium chloride was pH-adjusted and titrated by the same procedure. The available surface hydroxyl content was calculated from the amount of excess sodium hydroxide consumed in titrating the suspension, relative to the amount consumed in titrating the blank. The available surface hydroxyl content of the sample dried at 105° C. was determined to be about 1.1 mmol/gm of nano-crystalline anatase. The available hydroxyl content of the sample dried at 350° C. was determined to be about 0.4 mmol/gm of nano-crystalline anatase.

EXAMPLE 3

Batch Adsorption of Dissolved Metals from Aqueous Solutions

A powdered nano-crystalline anatase product was prepared according to the method of Example 1 using a drying temperature of 105° C. Aqueous samples of dissolved metals, or of the oxyanions arsenate (As(V)) and arsenite (As(III)), were prepared for testing by dissolving salts of the selected substances in tap water to the initial concentrations shown in Table 1, and adjusting the samples to a neutral pH. Batch experiments were conducted by adding the nano-crystalline anatase product to each aqueous sample, to obtain the titanium oxide content shown in Table I, and suspending the nano-crystalline anatase product in the aqueous sample by mixing for about one hour. The results in Table I show that the nano-crystalline anatase product removes a large percentage of each metal from the respective aqueous solutions in a relatively short time, i.e., one hour or less. The high degree of arsenite (As(III)) removal is particularly noteworthy, since conventional adsorbents, such as alumina or ferric hydroxide, are known to have much lower capacities for removal of this oxyanion. Similar degrees of removal were demonstrated in subsequent tests performed on samples of arsenate, arsenite and metal salts dissolved in deionized water. These tests demonstrated that presence of chloride, or of other acidic anions, is unnecessary for achieving high rates of removal with the nano-crystalline anatase product of the present invention.

average diameter of about 0.30 to 0.85 mm). The nano-crystalline anatase product was packed in a 1-inch diameter column to a bed depth of 6 inches. Arsenate and lead were added to tap water to obtain concentrations of 100 µg/L of As(V) and 100 µg/L of Pb(II), respectively, in separate tap water samples. Each tap water sample was pumped through the packed column at an empty bed contact time (EBCT) of 36–90 seconds. Effluent concentrations of both As(V) and Pb(II) were less than 3 µg/L. The attainment of such low effluent concentrations at a short EBCT indicates that adsorption of these contaminants at low concentrations occurs at a very rapid rate using the nano-crystalline anatase product of the present invention.

EXAMPLE 5

Arsenic Removal from Natural Groundwater

Figure 8:
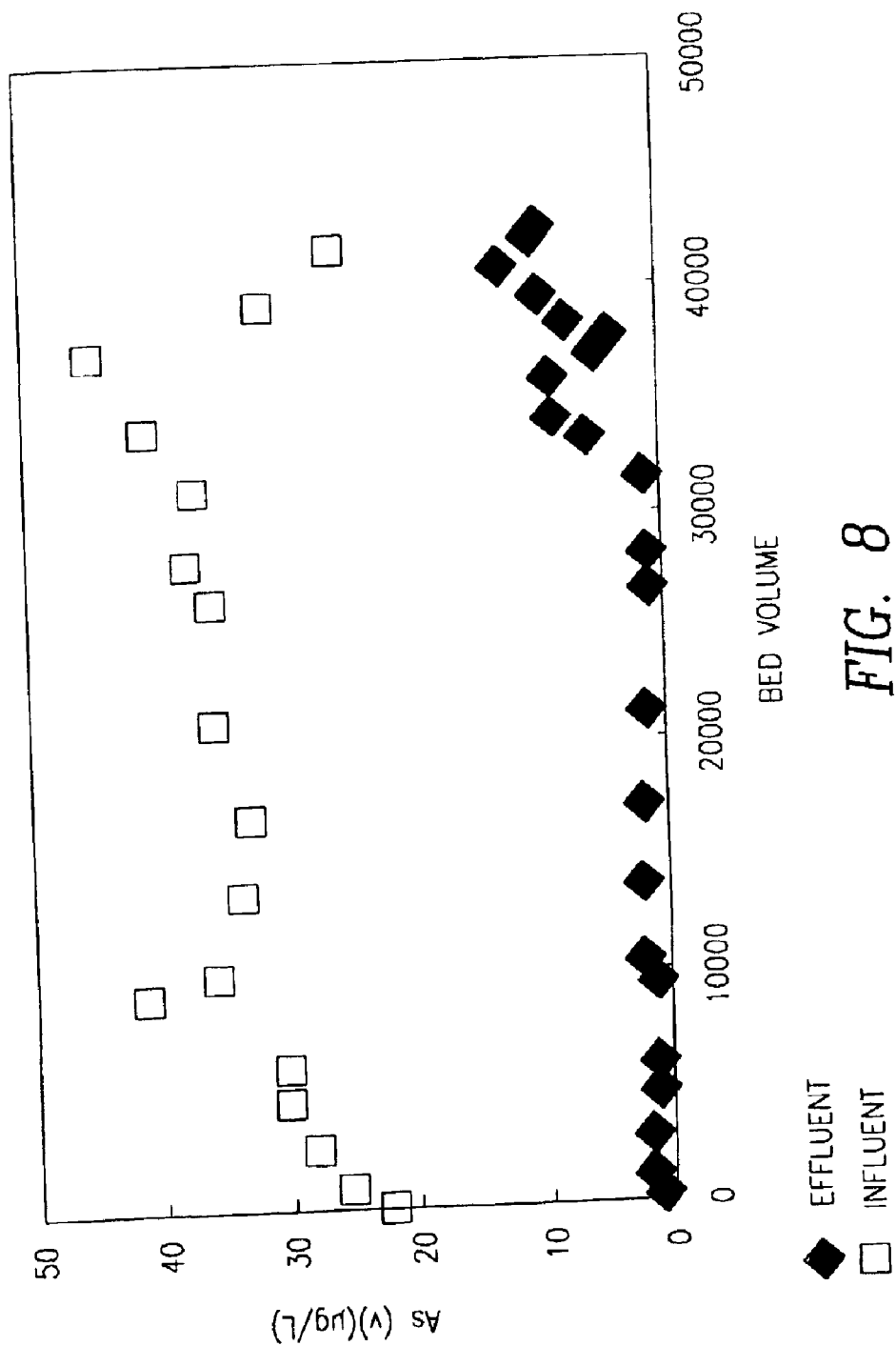
FIG. 8 is a graph showing the changes in influent and effluent concentrations of arsenic over the number of bed volumes of an aqueous stream filtered through a packed column of nano-crystalline anatase prepared according to the present invention.

A packed column of nano-crystalline anatase product was prepared as described in Example 4. Natural groundwater containing about 25 to 40 µg/L arsenic was pumped through the column at an EBCT of about 100 seconds. As shown in FIG. 8, arsenic concentrations in the treated effluent were less than 2 µg/L, with breakthrough occurring after more than 30,000 bed volumes of the contaminated groundwater had been treated.

EXAMPLE 6

Comparison of the Removal of Arsenate from Spiked Tap Water by Different Forms of Titanium Oxide Rutile having a primary crystallite diameter ($d_0$) of about 130 nm was obtained from a titanium oxide manufacturer. Nano-crystalline anatase having a primary crystallite diameter ($d_0$) of about 6.6 nm was prepared as described in Example 1, using a drying temperature of about 105° C. Two different amorphous titanium hydroxides were also prepared: one ("amorphous A") by rapidly neutralizing a solution of acidic titanyl sulfate; and the other ("amorphous B") by slowly adding water to a solution of titanium(IV) isopropoxide in isopropanol to hydrolyze the titanium isopropoxide. Arsenate (As(V)) was added to samples of tap water

TABLE I

Removal of Dissolved Contaminants by Powdered Nano-Crystalline Anatase

|  | As(V) | As(III) | Cd(II) | Pb(II) | U(VI) | Hg(II) | Cu(II) | Cr(VI) |
|---|---|---|---|---|---|---|---|---|
| Initial concentration (mg/L) | 50 | 50 | 1.0 | 1.0 | 8.0 | 0.5 | 0.5 | 0.1 |
| Final concentration (mg/L) | 9.1 | 13.0 | 0.024 | 0.018 | 0.08 | 0.026 | 0.005 | 0.003 |
| Percent removal (%) | 81.8 | 74.0 | 97.6 | 98.2 | 99.0 | 95.5 | 98.8 | 97.0 |
| Titanium oxide content (g/L) | 1.0 | 1.0 | 1.0 | 1.0 | 1.0 | 1.0 | 1.0 | 0.5 |

EXAMPLE 4

Column Filtration of Dissolved Contaminants from Aqueous Solution

Figure 9:
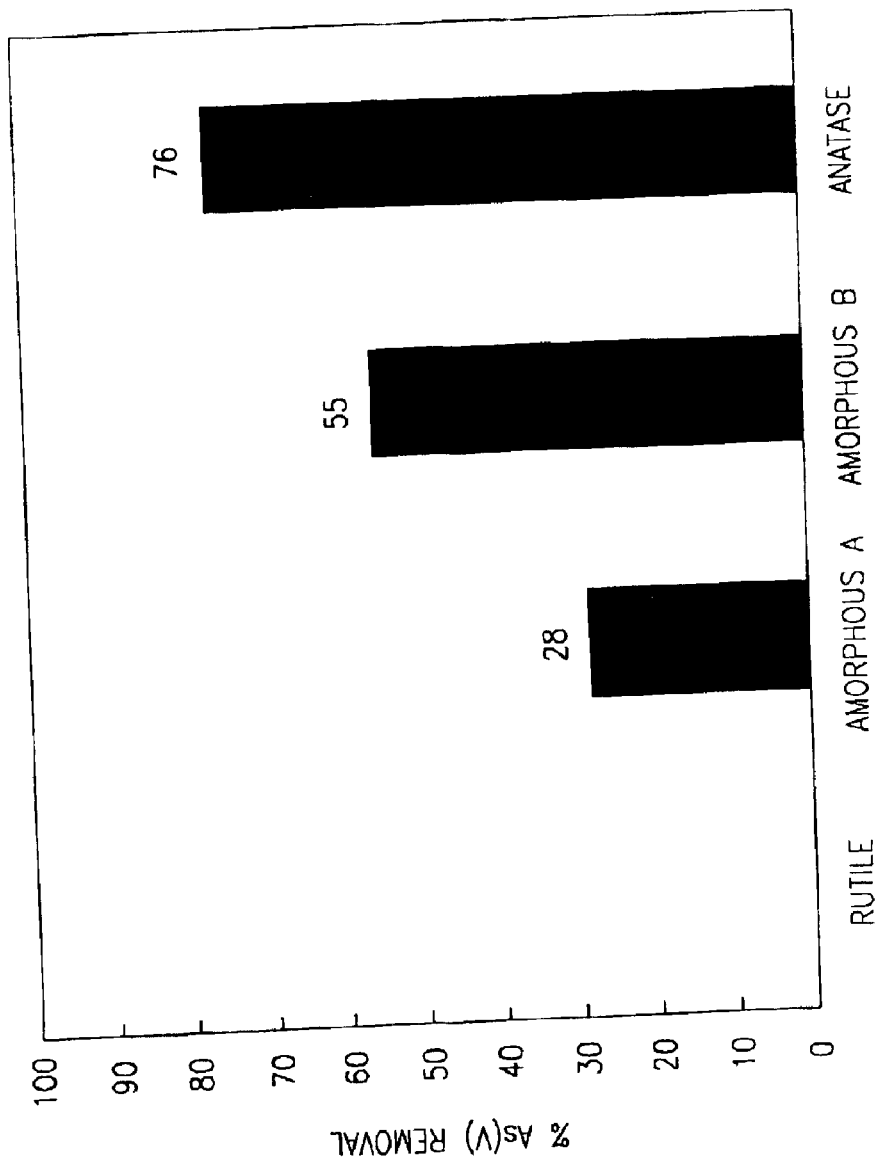
FIG. 9 is a bar chart of the efficiency of different forms of titanium oxide, including a nano-crystalline anatase prepared according to the present invention, in removing dissolved arsenate from water.

Samples of nano-crystalline anatase product were prepared according to the method described in Example 1 using a drying temperature of 105° C., and sieved to obtain a 20–50 standard U.S. mesh fraction (i.e., particles having an to an initial concentration of about 50 mg/L. About 0.1 gm of each sample of titanium oxide was added to 100 mL of the tap water sample at a neutral pH and suspended therein by mixing for about 1 hour. As shown in FIG. 9, the rutile sample was ineffective in removing dissolved arsenate from the tap water sample. The amorphous A and amorphous B samples removed 28% and 55% of the dissolved arsenate, respectively. The nano-crystalline anatase sample showed the greatest removal of dissolved arsenate at about 76% removal.

EXAMPLE 7

Effect of Anatase Crystal Size on Removal of Arsenate from Water

Figure 10:
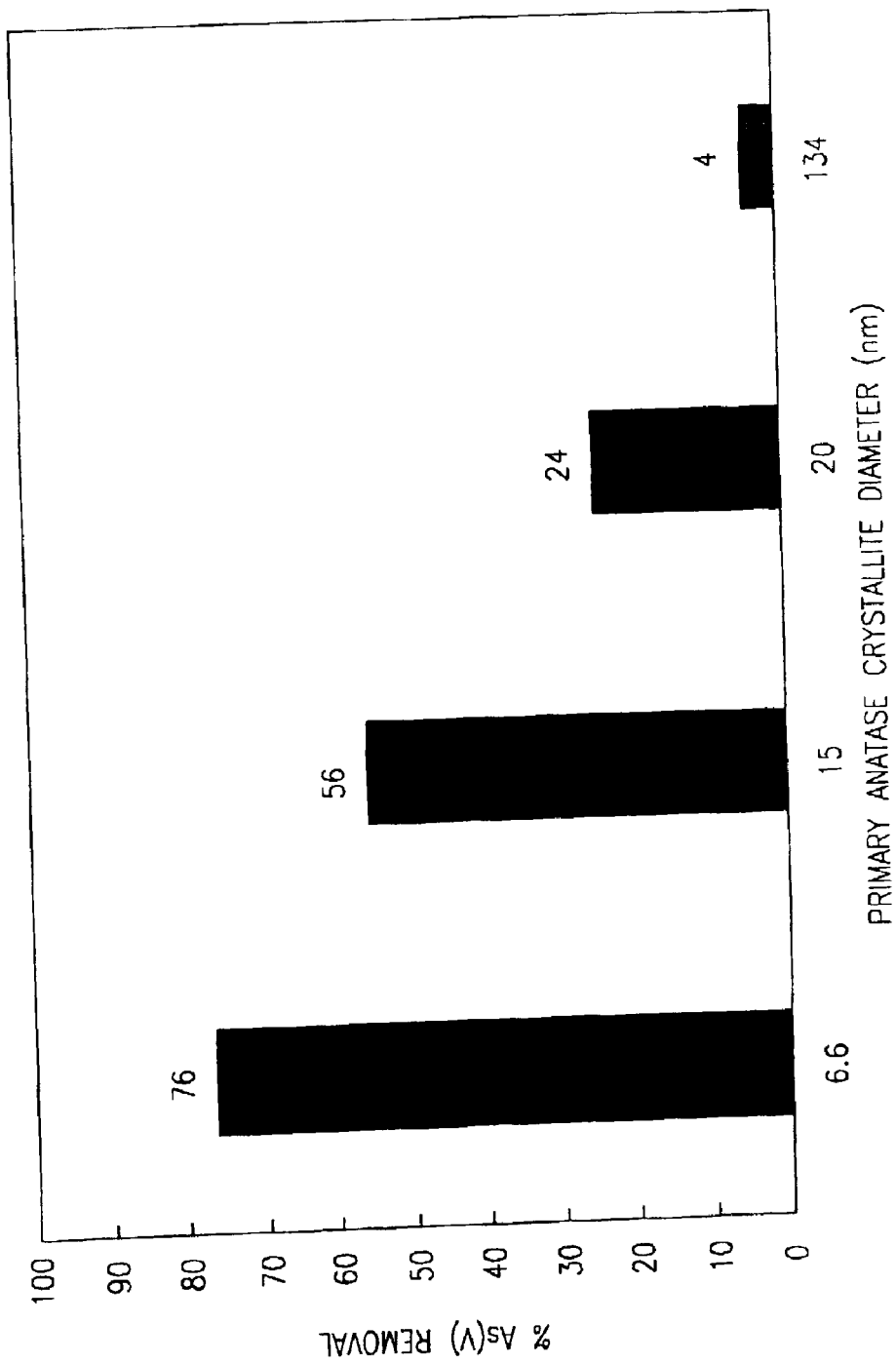
FIG. 10 is a bar chart comparing the efficiency of anatase having different primary crystallite diameters in removing dissolved arsenate from water.

A number of batch adsorption tests were performed in which samples of powdered nano-crystalline anatase product having different primary crystallite diameters ($d_0$) were used to remove arsenate from tap water samples. The data from these tests were analyzed to correlate the degree of arsenate removal with the primary crystallite diameter ($d_0$) of the anatase sample. As shown in FIG. 10, the degree of removal was highest for samples of anatase having the smallest primary crystallite diameters ($d_0$=6.6 nm) and lowest for samples of anatase having the largest primary crystallite diameters ($d_0$=134 nm).

EXAMPLE 8

Effect of Drying Temperature on Anatase Crystal Size and Adsorption Capacity

Figure 11:
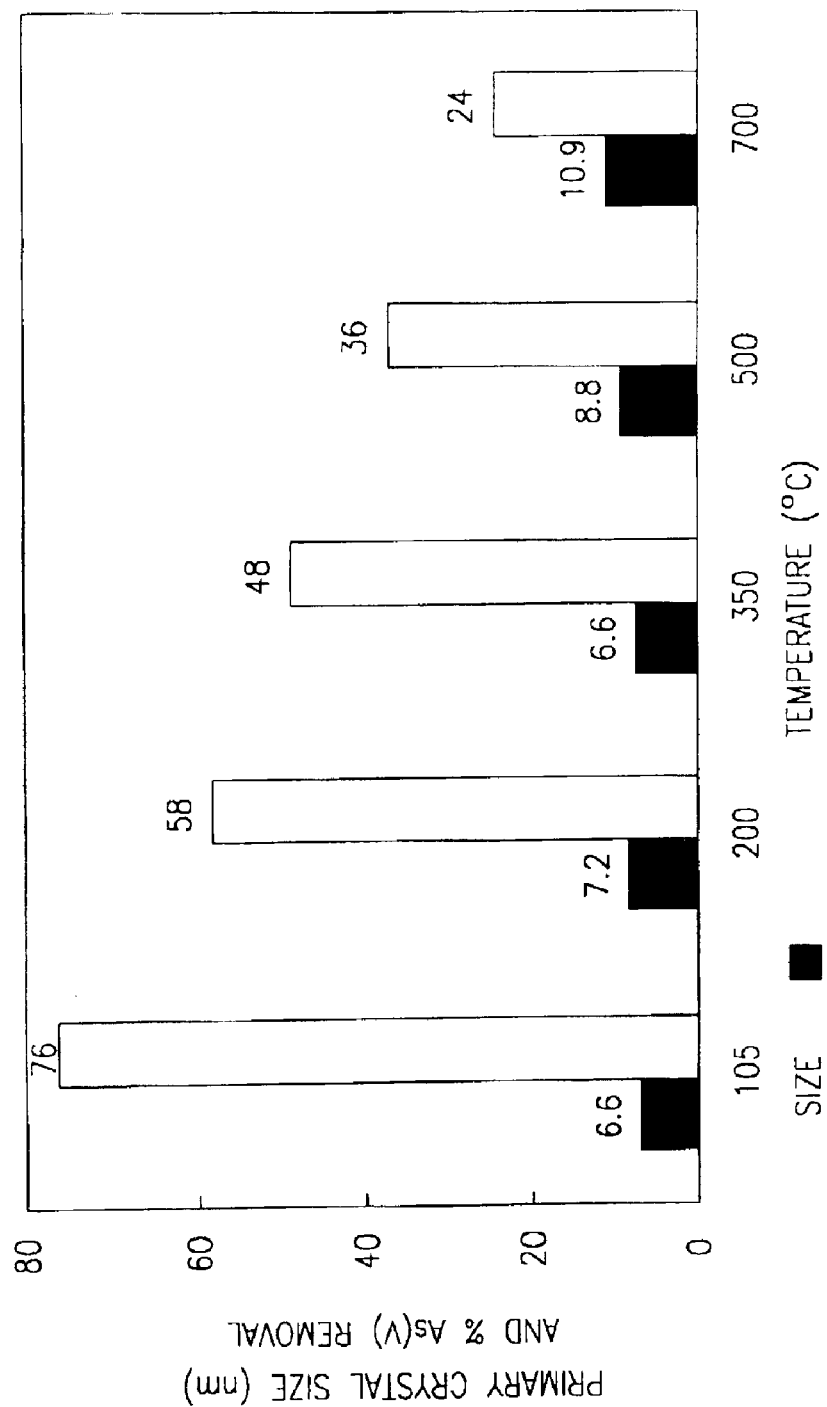
FIG. 11 is a bar chart comparing the crystallite diameters of samples of anatase and the efficiency of the anatase samples in removing arsenate from water to the temperature at which the anatase is dried during its production according to a method of the present invention.

A number of samples of powdered nano-crystalline anatase product were prepared at different drying temperatures according to the method described in Example 1 and tested for their effectiveness in removing arsenate from tap water samples. FIG. 11 illustrates the relationship of the drying temperature to the primary crystallite diameter of the anatase crystals in the surface-activated titanium oxide samples and to the degree of arsenate removal demonstrated in the batch adsorption tests. Drying the anatase product at temperatures up to 700° C. or greater increased the primary crystallite diameter ($d_0$) from about 6.6 nm at the lower temperatures to about 10.9 nm at the highest temperature. The removal efficiency of the titanium oxide product toward arsenate decreased from 76% to 24% over the same temperature range. Between drying temperatures of 105° C. and about 350° C., the removal efficiency dropped substantially without a commensurate increase in primary crystallite diameter ($d_0$).

EXAMPLE 9

Co-precipitation and Direct Filtration of Titanium Oxides and Arsenic

Tap water having an arsenic (As(V)) concentration of about 200 µg/L was filtered through a packed sand bed at a rate of 3 gpm/ft$^2$, in a co-precipitation/direct filtration system. Titanyl sulfate solution was injected into the water upstream of the packed bed at a rate of 3 mg/L (as Ti(IV)). The estimated detention time between the injection point and the effluent collection point was approximately 1 minute. The arsenic concentration in the treated effluent decreased from about 200 µg/L to less than 10 µg/L over the first 50 minutes of the test. The co-precipitation/direct filtration system achieved a steady-state effluent concentration of less than 5 µg/L of As(V).

EXAMPLE 10

Adsorption Capacity of a Nano-Crystalline Anatase Product

Figure 12:
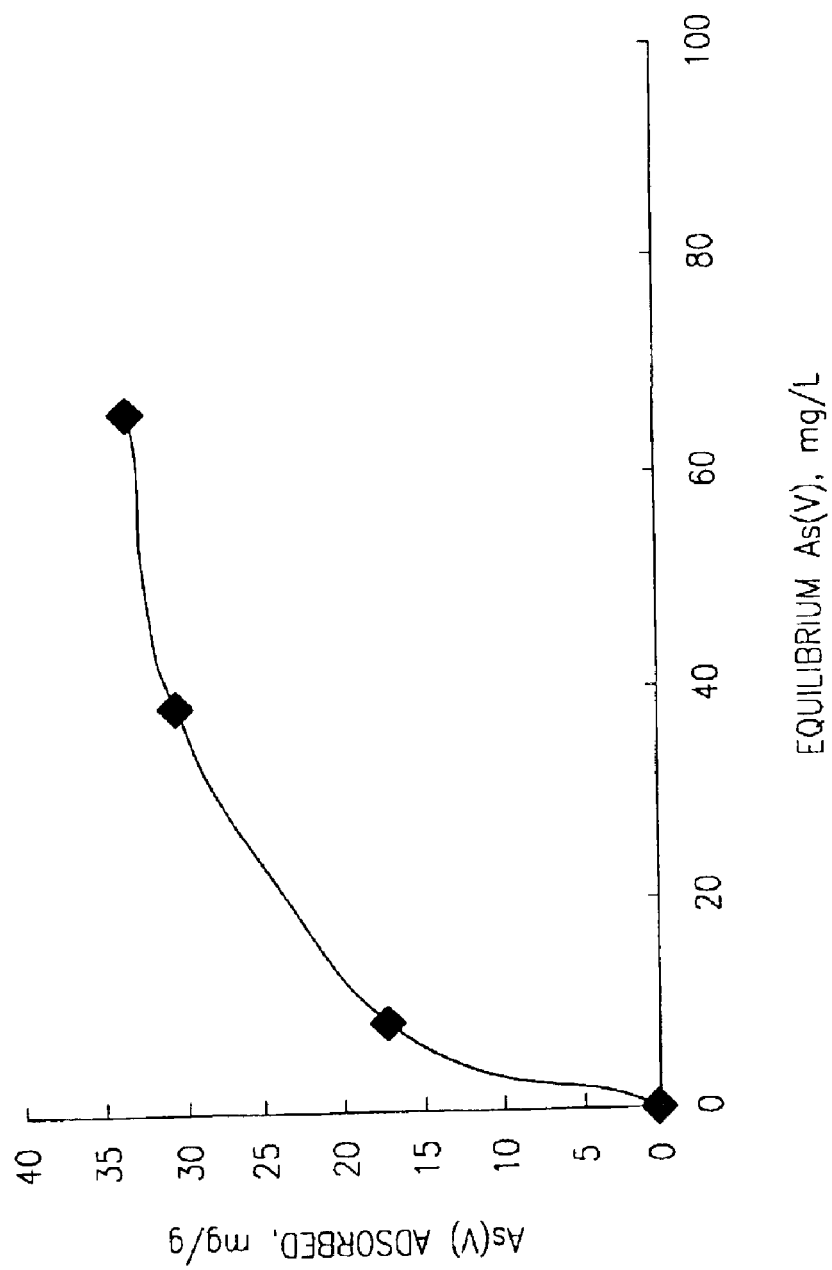
FIG. 12 is a graph of an adsorption isotherm of arsenate (As(V)) adsorption from water by nano-crystalline anatase prepared according to the present invention.

An adsorption isotherm (see FIG. 12) was prepared to assess the adsorption capacity of a surface-activated crystalline titanium oxide product prepared according to the method described in Example 1, using a drying temperature of 105° C. The tests were performed on a sieve fraction of the titanium oxide product in the size range of 16–30 mesh (i.e., having mean diameters between 0.60 and 1.18 mm). Arsenate (As(V)) solutions were prepared in tap water at a pH of about 7 at initial concentrations of 0–100 mg As(V)/L. The resulting isotherm indicates that the adsorption capacity of the surface-activated crystalline titanium oxide product is approximately 34 mg As(V)/gm of titanium oxide.

EXAMPLE 11

Comparison of the Batch Adsorption of Arsenate from Aqueous Solution by Nano-crystalline Anatase and Granular Ferric Hydroxide Batch adsorption tests were performed to compare the effectiveness of a powdered nano-crystalline anatase product, prepared according to the method of Example 1 using a drying temperature of 105° C., and a commercially-available granular ferric hydroxide adsorbent (trademark: GEH, Wasserchemie GmbH & Co. KG, Osnabrück, Germany) in removing arsenate (As(V)) from water. The arsenate (As(V)) samples were prepared at a neutral pH in tap water to an initial concentration of 50 mg As(V)/L. The nano-crystalline anatase and ferric hydroxide were added to their respective water samples to concentrations of 1.0 gm/L and suspended in the water samples by mixing for about one hour. The results in Table II show that the nano-crystalline anatase sample removed substantially more of the dissolved arsenate (81.8%) than did the ferric hydroxide sample (34.0%).

TABLE II

Comparison of As(V) Removal by Nano-Crystalline Anatase and Ferric Hydroxide

|  | Nano-crystalline anatase (1.0 g/L) | Ferric hydroxide (1.0 g/L) |
| --- | --- | --- |
| Initial concentration (mg/L) | 50 | 50 |
| Final concentration. (mg/L) | 9.1 | 33 |
| Percent removal, % | 81.8 | 34.0 |

As demonstrated by the Examples provided above, the surface-activated crystalline titanium oxide product of the present invention provides a high degree of removal for the dissolved inorganic substances tested. In particular, the product removes more than 95% of the metals tested from dilute aqueous solutions. Moreover, the surface-activated crystalline titanium oxide product exhibits a high adsorptive capacity and favorable kinetics of adsorption toward arsenate and arsenite in dilute aqueous solutions, reducing the concentration of those substances by about 80% with contact times on the order of 1 to 2 minutes. The surface-activated crystalline titanium oxide product can be produced from an intermediate slurry that is routinely generated in commercial titanium oxide production. Alternatively, it may be produced from any of a number of commercially available titanium compounds.

The effectiveness of surface-activated crystalline titanium oxide, specifically, nano-crystalline anatase, in removing arsenate, arsenite and other dissolved inorganic substances from water is an unexpected result in view of the conventional understanding that the adsorption capacity of a metal oxide is controlled by the availability of hydroxyl groups on the surface of the metal oxide product (see, e.g., U.S. Pat. No. 5,618,437, col. 4, lines 26–30, and U.S. Pat. No.

6,383,395, col. 7, lines 49–53). However, a hydrous or amorphous titanium hydroxide should have a greater number of available hydroxyl groups than a crystalline titanium oxide and, therefore, would be expected to exhibit a greater adsorptive capacity according to the conventional understanding. Example 6 demonstrates that, contrary to this expectation, the nano-crystalline anatase of the present invention has a higher adsorptive capacity than the amorphous titanium oxides. Moreover, the favorable adsorption kinetics of the titanium oxide products of the present invention are observed in the absence of acidic anions, such as chloride or sulfide, in contrast to expectations based on the disclosure of the Japanese Patent Application Publication 58-045705.

It should be understood that the embodiments described herein are merely exemplary and that a person skilled in the art may make many variations and modifications thereto without departing from the spirit and scope of the present invention. All such variations and modifications, including those discussed above, are intended to be included within the scope of the invention as defined in the appended claims. For example, the surface-activated crystalline titanium oxide product disclosed herein may be produced from a slurry of uncalcined titanium dioxide produced by a chloride process, instead of by a sulfate process. Moreover, the surface-activated crystalline titanium oxide product may contain various amounts of nano-crystalline rutile, or may consist primarily thereof. A surface-activated crystalline titanium oxide product may also be produced from hydrolysable titanium compounds other than those disclosed herein. The apparatus and methods of removing dissolved inorganic contaminants from water that are disclosed herein may be varied within the range of variations presently known in the art, e.g., by replacing the packed bed filter 92 with a fibrous filter or by contacting the aqueous stream with a fluidized bed, while using a nano-crystalline anatase or another surface-activated crystalline titanium oxide product therein. The products, apparatus and methods disclosed herein may also be applied to the removal of dissolved organic substances other than the organic-substituted arsenic compounds disclosed herein, including organic-substituted metallic compounds, such as tetra-ethyl lead, and oxygenated organic compounds, such as methyl-t-butyl ether (MTBE).

We claim:

1. A method for producing a surface-activated crystalline titanium oxide product for removal of dissolved contaminants from aqueous streams, comprising the steps of:
    preparing a titanium oxide precipitate from a mixture comprising at least one hydrolysable titanium compound;
    selecting a drying temperature to provide said titanium oxide precipitate with a high adsorptive capacity and a high rate of adsorption with respect to the dissolved contaminants; and
    drying said titanium oxide precipitate at said drying temperature for less than two hours, wherein said method does not include a calcining step.

2. The method of claim 1 wherein said step of preparing a titanium oxide precipitate includes the step of hydrolyzing a hydrolysable titanium compound in an aqueous mixture at a temperature greater than about 50° C. and less than about 180° C., thereby forming a titanium oxide precipitate.

3. The method of claim 2, wherein said temperature in said hydrolyzing step is greater than about 105° C. and less than about 120° C.

4. The method of claim 3, wherein said hydrolysable titanium compound is selected from the group of compounds consisting of titanium trichloride, titanium tetrachloride, titanyl sulfate, titanium sulfate, titanium oxysulfate, titanium iron sulfate solution, titanium oxychloride, titanium ethoxide, titanium ethyihexoxide, titanium isobutoxide, titanium isopropoxide, titanium isopropylate and titanium methoxide.

5. The method of claim 3, further comprising the step of contacting a particulate substrate with said aqueous mixture during said hydrolyzing step, wherein said titanium oxide precipitate comprises a titanium oxide precipitate adhering to said particulate substrate.

6. The method of claim 5, wherein said hydrolyzing step is performed so that said titanium oxide precipitate adhering to said particulate substrate includes nano-crystalline titanium dioxide.

7. The method of claims 5, wherein said hydrolyzing step is performed so that said titanium oxide precipitate adhering to said particulate substrate is formed as a gel.

8. The method of claim 1, wherein said drying temperature in said drying step is less than about 300° C.

9. The method of claim 8, wherein said drying temperature in said drying step is between about 100° C. and about 150° C.

10. The method of claim 9, wherein said drying temperature in said drying step is about 105° C.

11. A method for preparing a packed bed for use in removing dissolved contaminants from a dilute aqueous stream, comprising a step of infiltrating a solution of a hydrolysable titanium compound into a packed bed.

12. The method of claim 11, wherein said step of infiltrating said solution is completed less than seven minutes after the initiation of said infiltrating step.

13. The method of claim 11 wherein said packed bed is maintained at a temperature greater than 50_° C. during said infiltrating step.

14. The method of claim 11, wherein said hydrolysable titanium compound is selected from the group of compounds consisting of titanium trichloride, titanium tetrachloride, titanyl sulfate, titanium sulfate, titanium oxysulfate, titanium iron sulfate solution, titanium oxychloride, titanium ethoxide, titanium ethylhexoxide, titanium isobutoxide, titanium isopropoxide, titanium isopropylate, and titanium methoxide.

15. A method for removing dissolved contaminants from a dilute aqueous stream, comprising the step of contacting a nano-crystalline anatase product with a dilute aqueous stream containing dissolved inorganic contaminants, without irradiating said nano-crystalline anatase product.

16. The method of claim 15, wherein said contacting step includes contacting said nano-crystalline anatase product with a dilute aqueous stream containing a dissolved substance selected from the group consisting of aluminum, antimony, arsenic(III), arsenic(V), barium, cadmium, cesium, chromium, cobalt, copper, gallium, gold, iron, lead, manganese, mercury, molybdenum, nickel, platinum, radium, selenium, silver, strontium, tellurium, tin, tungsten, uranium, vanadium, zinc, nitrite, phosphate, sulfite, sulfide, and a low-molecular weight organic arsenic compound.

17. The method of claim 16, wherein said contacting step includes contacting said nano-crystalline anatase product with a dilute aqueous stream containing a dissolved substance selected from the group consisting of arsenic(III), arsenic(V), cadmium, chromium, copper, lead, mercury, tungsten, uranium, zinc, monomethylarsonic acid, dimethylarsinic acid, and phenylarsonic acid.

18. The method of claim 15, wherein the nano-crystalline anatase of the nano-crystalline anatase product has a mean primary crystallite diameter within the range of about 1 nm to about 30 nm.

19. The method of claim 18, wherein said nano-crystalline anatase has a mean primary crystallite diameter within the range of about 1 nm to about 10 nm.

20. The method of claim 15, wherein said nano-crystalline anatase product has an available hydroxyl content of at least about 0.2 mmol/gm of nano-crystalline anatase.

21. The method of claim 20, wherein said nano-crystalline anatase product has a BET surface area of at least about 100 m$^2$/gm of said product and a total pore volume of at least 0.1 cm$^3$/gm of said product.

22. The method of claim 15, wherein said nano-crystalline anatase product is in the form of granular particles.

23. The method of claim 22, wherein said granular particles comprise at least one material in addition to said nano-crystalline anatase.

24. The method claim 23, wherein said at least one material comprises a binder.

25. The method of claim 24, wherein said binder is selected from the group consisting of a silicate, a substituted cellulose, a vinyl polymer and water.

26. The method of claim 25, wherein said at least one material comprises a binder selected from the group consisting of sodium silicate, hydroxyethyl cellulose, polyvinyl alcohol and polyvinyl acetate.

27. The method of claim 15, wherein said contacting step includes the step of suspending said nano-crystalline anatase product in the dilute aqueous stream.

28. The method of claim 27, wherein said nano-crystalline anatase product comprises a nano-crystalline anatase on a surface of a particulate substrate.

29. The method of claim 27, wherein said nano-crystalline anatase product comprises a nano-crystalline anatase within a pore of a particulate substrate.

30. The method of claim 15, wherein said contacting step includes filtering the dilute aqueous stream through a bed containing said nano-crystalline anatase product.

31. The method of claim 30, wherein said bed comprises a particulate substrate.

32. The method of claim 30, wherein said nano-crystallifle anatase product comprises a particulate substrate having a surface at least partially coated with nano-crystalline anatase.

33. The method of claim 30, wherein said nano-crystalline anatase product comprises a particulate substrate having a plurality of pores, and nano-crystalline anatase within at least some of said pores.

34. The method of claim 30, wherein said bed is comprised in a packed column.

35. A method for removing dissolved contaminants from a dilute aqueous stream by adsorption, comprising the step of contacting a surface-activated titanium oxide product with the dilute aqueous stream without irradiating said surface-activated crystalline titanium oxide, said surface-activated crystalline titanium oxide product having an available hydroxyl content of at least about 0.2 mmol/gm of titanium oxide.

36. The method of claim 35, wherein said surface-activated crystalline titanium oxide product has a BET surface area of at least about 100 m$^2$/gm of said product and a total pore volume of at least 0.1 cm$^3$/gm of said product.

37. A method for removing dissolved contaminants from a dilute aqueous stream, comprising the steps of:
  adding a hydrolysable titanium compound to said dilute aqueous stream;
  co-precipitating a hydrolyzed titanium compound and said contaminants from said dilute aqueous stream, thereby forming a co-precipitate; and
  filtering said co-precipitate from the dilute aqueous stream using a packed bed filter,
  wherein said filtering step is performed concurrently with said co-precipitating step.

38. The method of claim 37, wherein said adding step includes injecting a solution of said hydrolysable titanium compound into the dilute aqueous stream.

39. The method of claim 37, wherein said adding step is performed less than seven minutes before the completion of said filtering step.

40. The method of claim 37, wherein said hydrolysable titanium compound is selected from the group of compounds consisting of titanium trichloride, titanium tetrachloride, titanyl sulfate, titanium sulfate, titanium oxysulfate, titanium iron sulfate solution, titanium oxychloride, titanium ethoxide, titanium ethylhexoxide, titanium isobutoxide, titanium isopropoxide, titanium isopropylate and titanium methoxide.

41. A particulate titanium oxide product, comprising crystalline a natase having an a vailable hydroxyl content of at least about 0.2 mmol/gm of titanium oxide.

42. The particulate titanium oxide product of claim 41, wherein said product has a BET surface area of at least about 100 m$^2$/gm of said product and a total pore volume of at least 0.1 cm$^3$/gm of said product, and wherein said crystalline anatase has crystallite diameters in the range of 1 to 30 nm.

43. The particulate titanium oxide product of claim 41, wherein said crystalline anatase is mixed with a binder selected from the group consisting of a silicate, a substituted cellulose, a vinyl polymer and water.

44. The particulate titanium oxide product of claim 41, further comprising a particulate substrate, wherein at least some of said crystalline anatase adheres to a surface of said particulate substrate.

45. A particulate titanium oxide product, comprising crystalline a natase having a n a vailable h ydroxyl content of at least about 0.2 mmol/gm of titanium oxide, wherein said product is prepared by a process including the steps of:
  preparing a titanium oxide precipitate from an aqueous mixture comprising at least one titanium compound;
  selecting a drying temperature to provide said titanium oxide precipitate with a high adsorptive capacity and a high rate of adsorption with respect to the dissolved contaminants; and
  drying said titanium oxide precipitate at said drying temperature for less than two hours, wherein said method does not include a calcining step.

* * * * *